Dec. 24, 1968 D. K. LEIDER ET AL 3,417,796

DEBARKING APPARATUS

Filed Feb. 15, 1966 8 Sheets-Sheet 1

*INVENTORS.*
RICHARD E. O'BRIEN
DANIEL K. LIEDER

BY

[signature]

ATTORNEY.

Dec. 24, 1968 D. K. LEIDER ET AL 3,417,796
DEBARKING APPARATUS
Filed Feb. 15, 1966 8 Sheets-Sheet 2

INVENTORS.
RICHARD E. O'BRIEN
DANIEL K. LEIDER
BY
ATTORNEY.

INVENTORS.
RICHARD E. O'BRIEN
DANIEL K. LIEDER
BY
ATTORNEY.

INVENTORS.
RICHARD E. O'BRIEN
DANIEL K. LIEDER
BY
ATTORNEY.

*INVENTORS.*
RICHARD E. O'BRIEN
DANIEL K. LIEDER
BY
ATTORNEY.

INVENTORS.
RICHARD E. O'BRIEN
DANIEL K. LIEDER
BY
ATTORNEY.

INVENTORS.
RICHARD E. O'BRIEN
DANIEL K. LIEDER
BY
ATTORNEY.

DEBARKING APPARATUS

INVENTORS.
RICHARD E. O'BRIEN
DANIEL K. LIEDER
BY
ATTORNEY.

United States Patent Office 3,417,796
Patented Dec. 24, 1968

3,417,796

DEBARKING APPARATUS

Daniel K. Leider and Richard E. O'Brien, Manitowoc, Wis., assignors to Manitowoc Shipbuilding, Inc., Manitowoc, Wis., a corporation of Wisconsin
Filed Feb. 15, 1966, Ser. No. 527,463
20 Claims. (Cl. 144—208)

ABSTRACT OF THE DISCLOSURE

A log debarking apparatus is provided which comprises means for controlling discharge of material therefrom.

The present invention pertains generally, to debarking apparatus, and more particularly, to an apparatus, mechanism or arrangement of structure for controllably discharging material from the chamber of a rotary substantially cylindrical multicourse drum or shell structure in which the bark of logs, such as pulp wood logs, or the like, is removed in order to condition the logs for use in paper making or other similar industries.

In the manufacture of most grades of paper, the bark must be carefully removed from the logs before grinding or chemical processing and the peeling of the bark from the logs, sometimes referred to as either barking or debarking, is generally accomplished by means of a drum barker or debarker. The drum barker usually comprises a drum or steel barrel which is generally horizontally positioned and rotated to tumble logs contained therein for enabling friction to peel the bark off the logs. The logs are tumbled generally into one end portion of the horizontally rotating drum, are tumbled within the drum, and are then discharged therefrom adjacent the other end portion thereof.

The debarking may be either a batch type process, wherein a group of logs is debarked and then emptied from the barking drum, or may be a substantially continuous process wherein logs are continually fed into an inlet opening of the drum and discharged from the outlet opening thereof. In either type debarking, however, the length of time that the logs are to be held within the barking drum must be controllable, since the length of time required to debark the logs depends upon the type of logs and the condition of the logs.

In the batch type of debarking operation, it is highly desirable to be able to readily, efficiently, economically and quickly discharge the entire batch of one type or species of logs so that the drum may be charged with another type or species of logs.

However, when debarking logs either by a batch type or continuous operation, it may develop that certain types of logs are harder than other types and consequently more difficult to bark or debark and even in situations where the logs are frozen it is more difficult to debark or bark frozen logs of the same type or species than when such logs are not frozen. For this reason it is highly desirable to be able to readily, efficiently and economically control the level of the logs within the drum so that a higher wood level may be obtained therein when barking or debarking logs which are harder to peel than other logs.

Moreover, it is desirable to be able to control the quality of the debarking of logs within the barking drum at any given time since the tumbling action and friction between the logs is dependent upon the number of logs within a drum.

Having in mind the foregoing, it will be understood that a primary object of the present invention is to provide a rotatable debarking drum comprising an improved discharge mechanism, apparatus, arrangement of structure or assembly adjacent one end portion thereof for controlling at will the discharge of debarked logs from the drum.

Another primary object of this invention is to provide an improved discharge mechanism, apparatus, arrangement of structure or assembly for a rotatable debarking drum with the discharge mechanism, apparatus, arrangement of structure or assembly being operably controlled to vary the quantity of debarked logs which may be discharged therefrom.

Yet another primary object of the present invention, in addition to the foregoing objects, is to provide improved discharge mechanism, apparatus, arrangement of structure or assembly for a rotatable debarking drum wherein the discharge mechanism, apparatus, arrangement of structure or assembly is provided with structure that is adjustably disposed for selectively controlling the discharge of debarked logs from the drum.

It is a further primary object of this invention, in addition to each of the foregoing objects, to provide improved discharge mechanism, apparatus, arrangement of structure or assembly for a rotatable debarking drum wherein the discharge mechanism, apparatus, arrangement of structure or assembly is provided with structure that is adjustably disposed for selectively maintaining a desired level of logs within the debarking drum.

It is an additional primary object of the present invention, in addition to each of the foregoing objects, to provide improved discharge mechanism, apparatus, arrangement of structure or assembly for a rotatable debarking drum wherein the discharge mechanism, apparatus, arrangement of structure or assembly is provided with structure that may be adjustably disposed for discharging debarked logs from the drum.

It is an additional primary object of the present invention, in addition to each of the foregoing objects, to provide improved discharge mechanism, apparatus, arrangement of structure or assembly for a rotatable debarking drum wherein the discharge mechanism, apparatus, arrangement of structure or assembly is provided with structure that may be adjustably disposed for entirely and completely discharging debarked logs from the drum.

It is also an additional further primary object of the present invention, in addition to each of the foregoing objects, to provide an improved log debarking or barking apparatus wherein there is provided an elongate shell structure having a plurality of courses wherein certain ones of the shell courses are imperforate and longitudinally spaced apart with the shell courses that are disposed between the certain ones of the shell courses being perforated with some or all of the remaining shell courses being imperforate at areas which will define the intake and the discharge portions of the shell structure.

Other objects, advantages and important features of the present invention will be apparent from a study of the specification following taken with the drawing which together describe, disclose, illustrate and show embodiments or modifications of an apparatus, mechanism, arrangement of structure or assembly particularly adapted to be utilized within a system employing a method or process for debarking logs, and what is now considered and believed to be the best method of practicing the principles thereof. Still other embodiments, modifications, procedures or equivalents may be apparent to those having the benefit of the teachings herein, and such other embodiments, modifications, procedures or equivalents are intended to be reserved especially as they fall within the scope and breadth of the sub-joined claims.

This application discloses structure similar to that disclosed in the copending application Ser. No. 333,326, filed Dec. 26, 1963, entitled Debarking Apparatus, now United States Letters Patent 3,262,477 issued on July 26, 1966.

Figure 1:
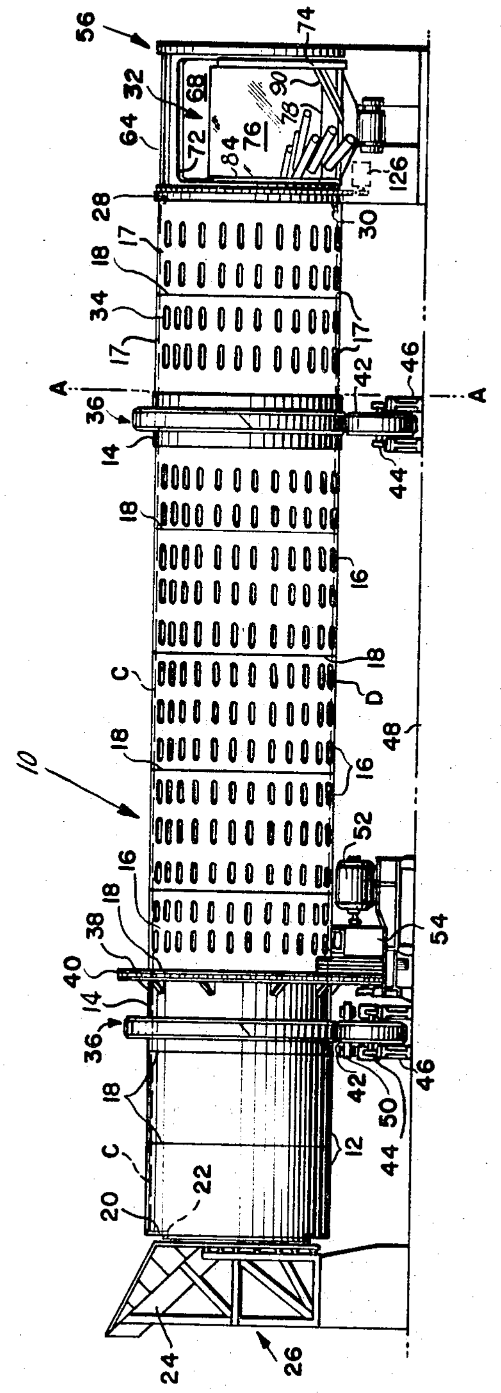
FIGURE 1 is a side elevational view of an elongate rotary log debarking drum apparatus having log feeding and log discharge control structures adjacent the opposite respective end portions thereof.

With reference now to the drawing, and particularly to FIGURE 1 thereof, wherein there is illustrated apparatus, arrangement of structure or assembly 10 for treating or conditioning material, such as debarking logs or the like. The apparatus 10 comprises an elongate rotatably supported drum or shell structure D of preferably cylindrical configuration, formed of a plurality of separate and independent cylindrical sections or courses 12, 14, 16 and 17, positioned in end-to-end longitudinally abutting relationship relative to each other. The courses or sections 12, 14, 16 and 17 are rigidly secured together at jointure locations 18 in any suitable manner, as through the medium of welding, or the like to form the single unitary and relatively rigid elongate drum or shell structure D.

All of the above sections or courses 12, 14, 16 and 17 have cylindrical inner walls each of which have substantially the same inner diameter forming an inner cylindrical chamber C, certain ones of the sections or courses, i.e., the two longitudinally spaced cylindrical sections 14 are preferably imperforate and may be of silghtly greater thickness than the other sections or courses 12, 16 and 17. The shell courses 16 which are disposed intermediate the certain shell sections or courses 14 are all perforated in a manner which will be described and disclosed in more detail hereinafter with the remaining shell sections or courses 12 and 17 which are disposed generally longitudinally outwardly from the imperforate certain sections or courses 14 of the shell structure D define, respectively, inlet and discharge areas for the chamber C of the drum D with the sections or courses 12 being disposed upstream relative to the path through which the material or logs will travel when being treated or conditioned by the apparatus 10 with the discharge area defined by the sections 17 being downstream therefrom.

As illustrated, the inlet courses or sections 12 are preferably imperforate with the discharge courses or sections 17 being perforated in a manner similar to the certain courses or sections 14 but it is to be understood that the discharge courses or sections 17 may also be imperforate while the intake courses or sections 12 may be perforated and that both the intake 12 and the discharge 17 courses or sections may be imperforate.

Adjacent the upstream or left end portion of the rotary drum or shell structure D, as viewed in FIGURE 1, there is provided an end wall portion 20 having a generally circular log intake or admission opening 22 through which the material, such as logs to be debarked, are received into the cylindrical chamber C from a log chute 24 suitably supported by means 26, while adjacent the downstream or other end portion of the drum D there is provided an end wall portion 28 for the chamber C of the drum or shell structure D having an opening 30 for the discharge of material such as debarked logs. The discharge opening 30 is variable and closable at will by discharge control structure 32, to be more fully described and disclosed in more detail hereinafter.

As shown in FIGURE 1, the cylindrical sections 16 and 17 of the debarking drum or shell structure D are provided throughout the entire combined peripheral surface area thereof with a plurality of uniformly spaced rows of elongate slots or perforations 34 which are preferably radially outwardly tapered for facilitating in the passage of bark, dirt, debris and other material therethrough in order that the same may be removed from within the inner cylindrical chamber C of the drum D, during the debarking process. The slots 34 are preferably arranged in a series of equally spaced circumferentially aligned and equally spaced longitudinally extending and aligned rows relative to the drum D, with the slots 34 being equally spaced apart relative to each other.

Figure 9:
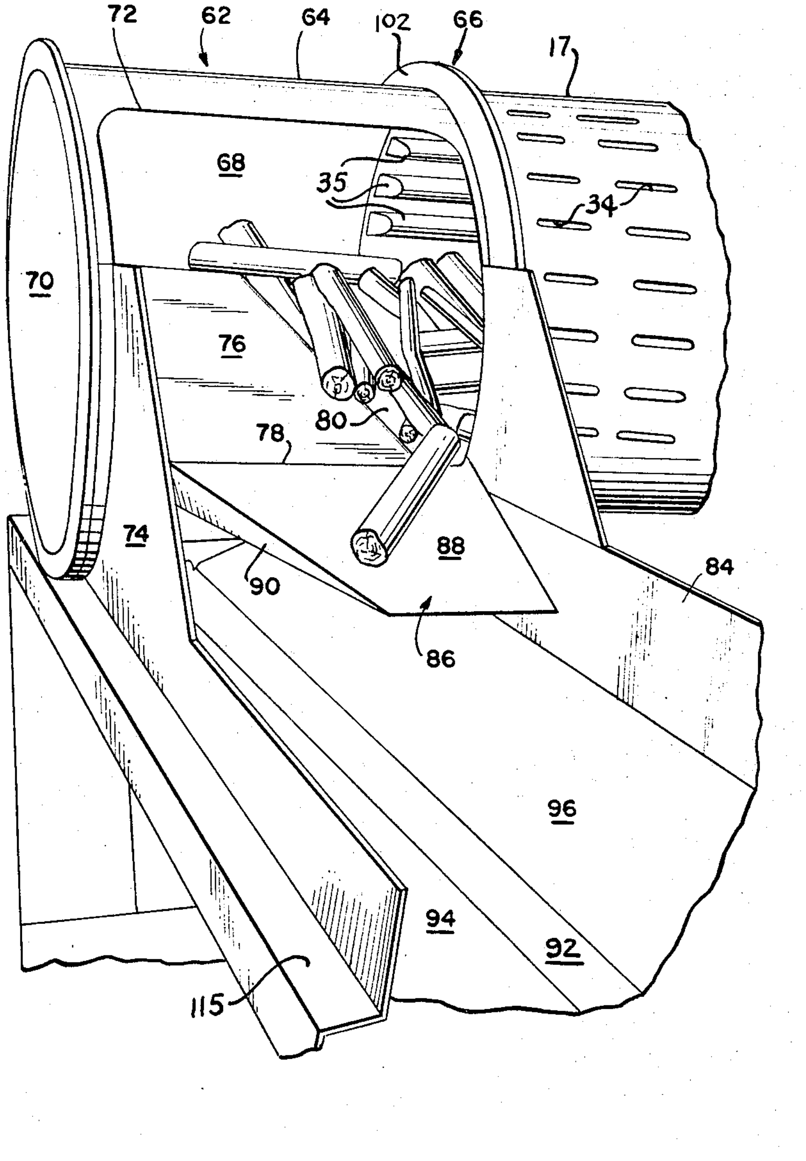
FIGURE 9 is a schematic perspective view similar to FIGURE 7, but taken from a different angle and showing the control of the discharge of logs from the drum apparatus.
Figure 10:
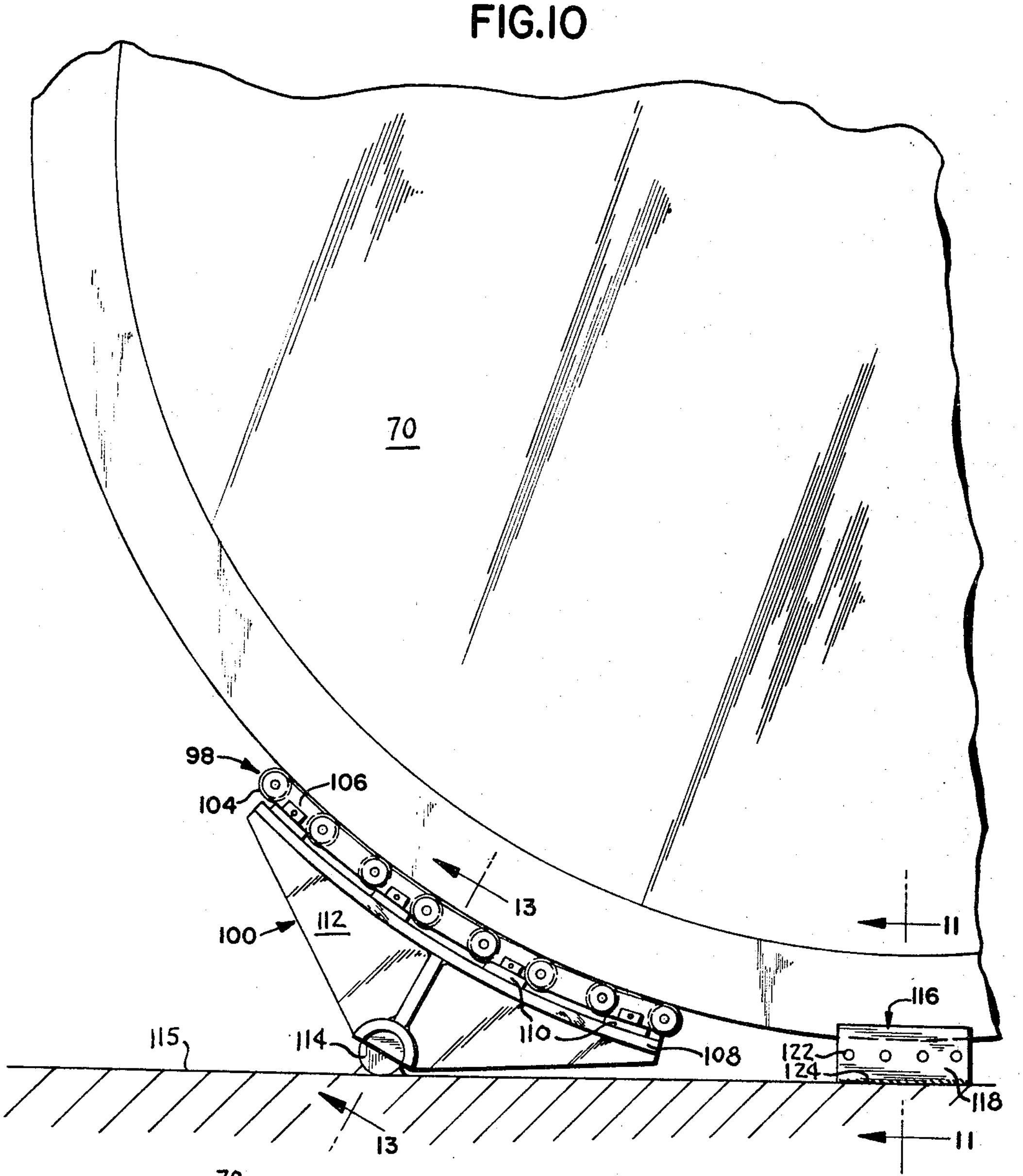
FIGURE 10 is an enlarged fragmentary view of FIGURE 3.
Figure 11:
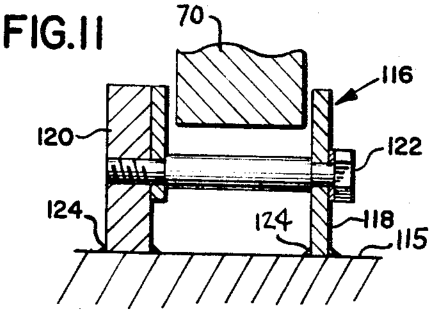
FIGURE 11 is a cross-sectional view taken along the line 11—11 of FIGURE 10.
Figure 12:
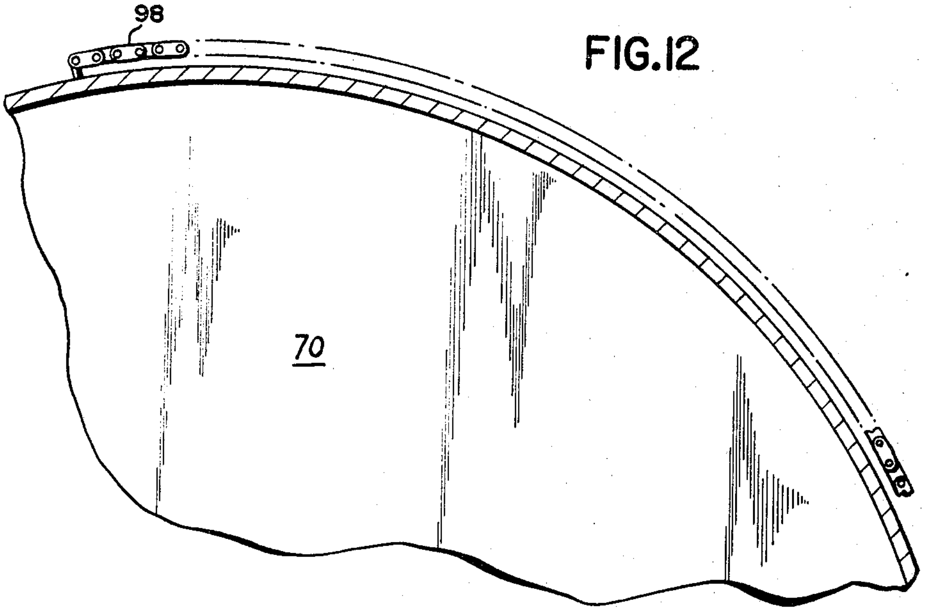
FIGURE 12 is an enlarged fragmentary end view of FIGURE 3, similar to FIGURE 10, showing a chain drive arrangement.
Figure 13:
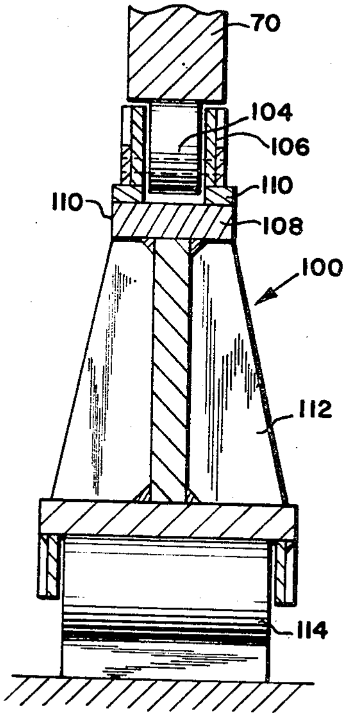
FIGURE 13 is an enlarged cross-sectional view taken along the line 13—13 of FIGURE 10.
Figure 14:
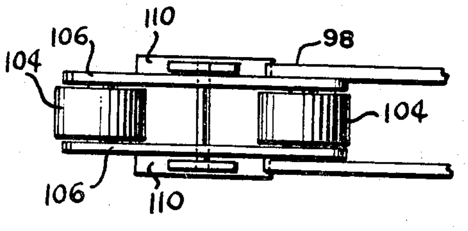
FIGURE 14 is a top plan view of the chain drive support shown in FIGURE 13.

The interior surface of the chamber C may be provided with elongate rib or log lifters 35, note FIGURE 9, in a manner as disclosed in U.S. Patent 3,262,477.

For enabling the drum or shell structure D to be rotated, each of the two longitudinally spaced imperforate cylindrical certain ones of the sections or courses 14 is provided with means such as an encircling concentric "rotation girth" type tire-like member 36 of massive construction secured to each of the drum sections or courses 14. There are preferably only two tire-like members 36 employed in the embodiment herein described. It will be understood, however, that any desired number may be used, the number being dependent upon various factors, such as drum length, diameter, shell thickness, weight loading inclusive of the logs to be debarked, and the like.

Also mounted on one of the imperforate drum sections or courses 14, and preferably the one at the left as viewed in FIGURE 1, is a driven sprocket or ring 38 for receiving a driving chain 40 to rotate the drum or shell structure D.

The cylindrical drum or shell structure D is rotatably supported by the tire-like members 36 being each mounted or positioned on a pair of large diameter support rollers 42, positioned in transverse spaced relationship on each side of the vertical plane passing through the longitudinal axis of the drum or shell structure D. The support rollers 42 are each freely rotatable in self-aligning bearings 44 and are adjustably positioned on a suitable but preferably structural steel load support 46 which in turn may be supported by a reinforced concrete foundation 48.

The tire-like member 36 at the left or log intake end portion of the drum or shell structure D is laterally engaged at each side thereof and midway between the support rollers 42 by a lateral thrust roller 50 freely rotatably supported on and structurally associated with the support 46. Each of the thrust rollers 50 rotatably engages a respective machine side or bearing face of the respective tire-like member 36, preferably in a location lying in the vertical plane of the axis of the drum or shell structure D.

The drum or shell course D is rotatably driven by a source of power 52 such as a motor or engine of any desired type, coupled to a speed reducing gear 54 the output of which is operatively drivingly engaged with the sprocket chain 40 to rotatably drive the cylindrical drum or shell structure D by means of the driven sprocket or ring 38 rigidly associated with the drum D.

If desired, a more detailed description and disclosure of the shell sections or courses 14 together with the slots or perforations 34 therein as well as the ribs or log lifters 35 and the tire-like members 36 with the arrangement for rotating the drum or shell structure D, that is the driven sprocket or ring 38, the driving chain 40, the roller 42, the bearings 44, the support 46, the foundation 48, the thrust roller 50, the source of power 52 and the reducing gear 54 may be had from the above-identified copending application Ser. No. 333,326 filed Dec. 26, 1963, now United States Letters Patent 3,262,477 issued on July 26, 1966.

Figure 2:
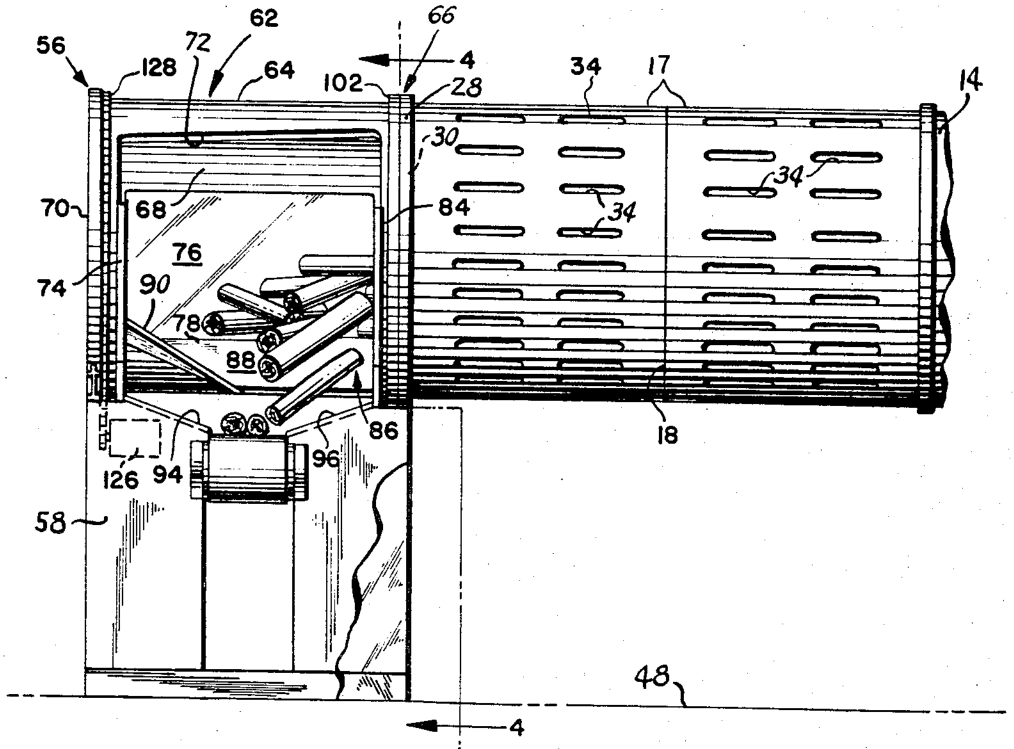
FIGURE 2 is an enlarged side elevational view of the right end portion of the apparatus extending to the line A—A in FIGURE 1, showing the log discharge control structure in operative use.

With particular reference now to FIGURE 2 of the drawing, there is illustrated in more detail therein the combined discharge control, arrangement or structure 32 and a log discharge hood or chute support frame structure 56 mounted on the foundation 48 and positioned in close proximity to and extending across the discharge end opening 30 of the debarking drum or shell structure D.

Figure 3:
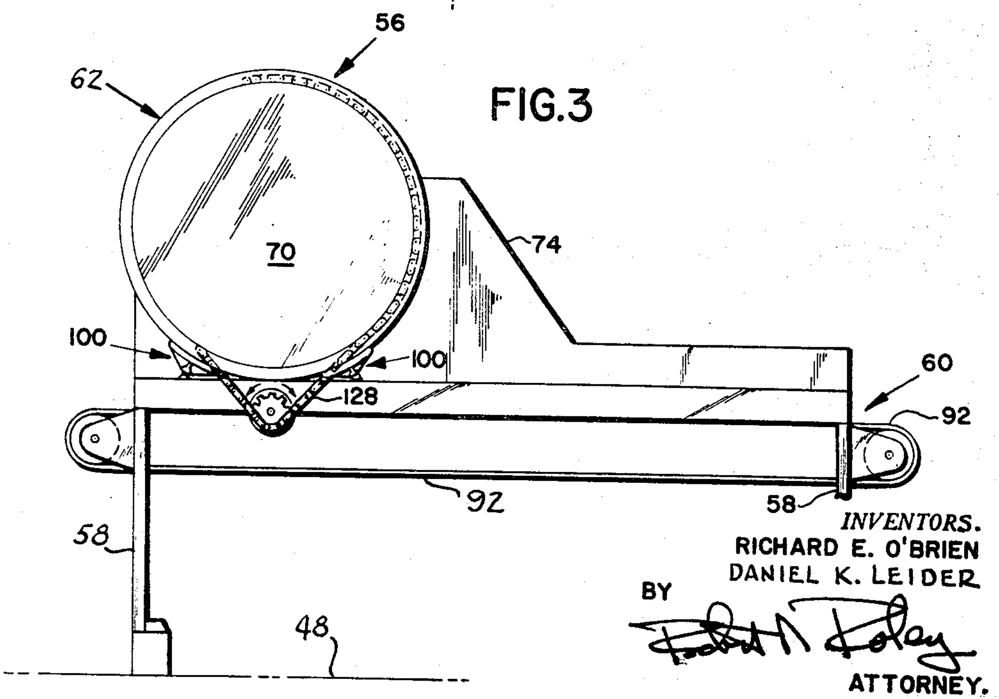
FIGURE 3 is an end elevational view of FIGURE 2.
Figure 4:
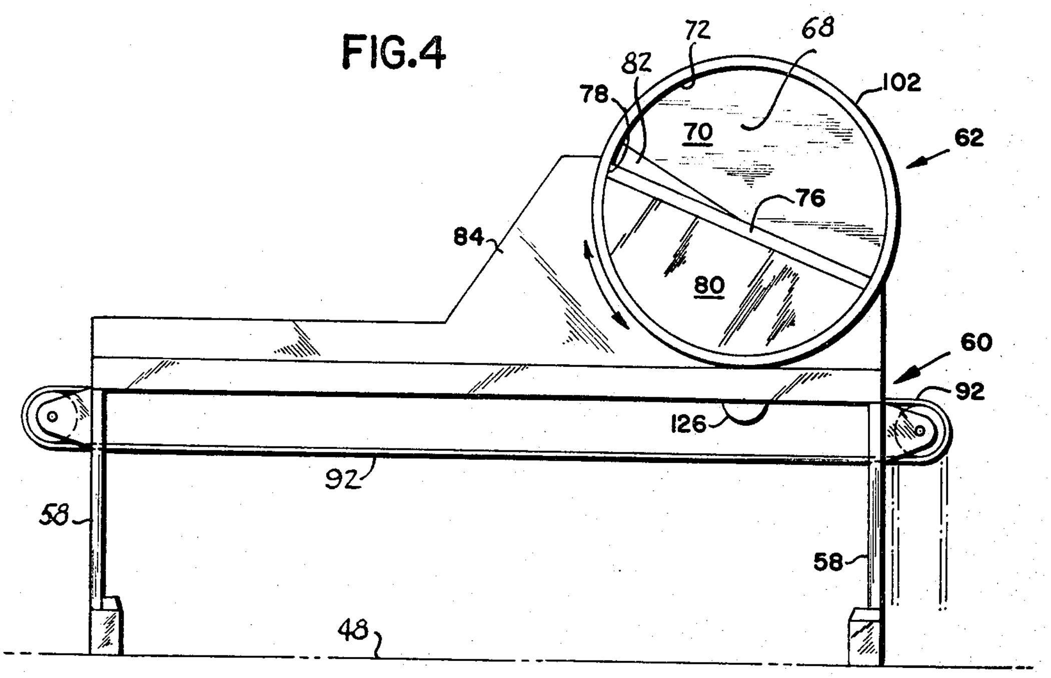
FIGURE 4 is a cross-sectional view taken along the line 4—4 of FIGURE 2, showing the log discharge control structure in a fully closed, second or an extreme position thereof.

As clearly illustrated in that figure, and in FIGURES 3 and 4, the structure 32 and 56 will be seen to comprise a support base 58 provided at the upper portion thereof with conveyor arrangement 60 and a discharge hood 62. The discharge hood 62 is constructed and arranged to discharge logs from the chamber C of the drum or shell structure D onto the conveyor arrangement 60.

The discharge hood 62 comprises a cylindrical housing member 64 axially aligned with the drum D and rotatably mounted for movement relative thereto by means of support member 66 to axially concentrically align a discharge chamber or enclosure 68 defined by the cylindrical housing member 64 with the chamber C of the drum D, communication between the chamber or enclosure 68 and the chamber C being provided by the discharge opening 30 of the drum D. The end portion of the cylindrical housing member 64 which is spacedly separated from the support member 66 is closed by a downstream end plate 70, and a substantially rectangular discharge opening 72 is provided transversely through the cylindrical housing member 64. The end plate 70 is supported for rotation with the cylindrical housing member 64 on a side plate 74 supported on the base structure 58.

Figure 5:
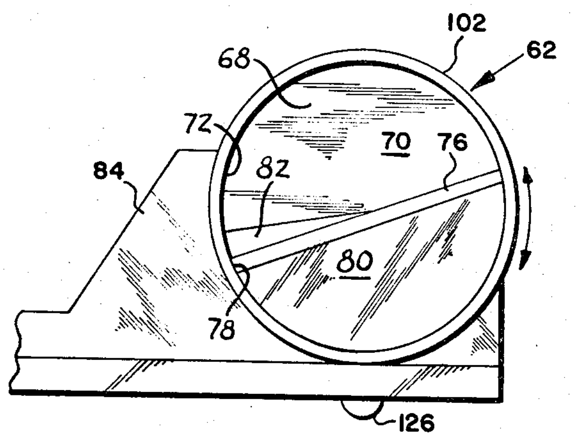
FIGURE 5 is a fragmentary view similar to FIGURE 4, but showing the log discharge control structure in a normal operative or intermediate position thereof.
Figure 6:
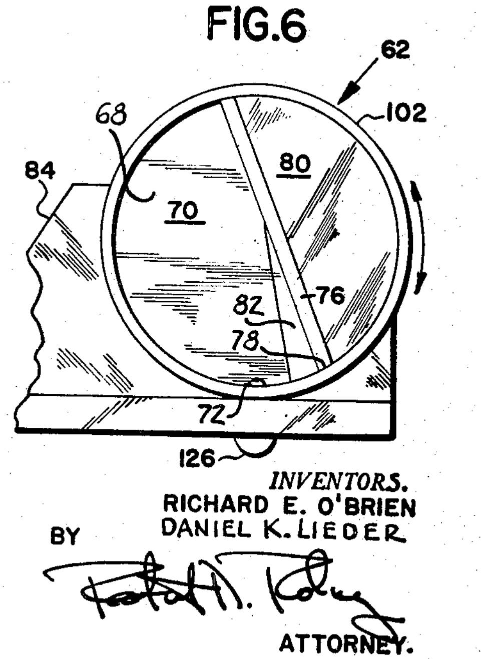
FIGURE 6 is a fragmentary view similar to FIGURE 5 by showing the log discharge control structure in a full closed discharge, first or extreme position thereof.

A first member or deck plate 76 is structurally associated with the cylindrical housing member 64 and within the discharge chamber or enclosure 68 thereof, one edge portion of the first member or deck plate 76 being aligned with a generally longitudinally extending edge portion 78 of the rectangular opening 72 of the cylindrical housing member 64, with the first member or deck plate 76 extending transversely across the discharge chamber 68 of the housing member 64 and defining therewith a series of chords across the discharge chamber 68 when viewed from an end of the appartus 10, as shown in FIGURES 4, 5 and 6.

The deck plate 76 extends longitudinally through a portion of the discharge chamber 68, being disposed relative to the cylindrical housing member 64 at a slight angle to the longitudinal axis thereof. Accordingly, the deck plate 76 slopes slightly away from the longitudinal axis of the discharge chamber 68 so that the discharge chamber 68 is slightly wider at the upstream end portion thereof adjacent the drum D than adjacent the end plate 70.

This enables the logs deposited on the deck plate 76 during operation of the apparatus, mechanism, arrangement of structure 10 to be biased by gravity back toward the drum D.

Figure 7:
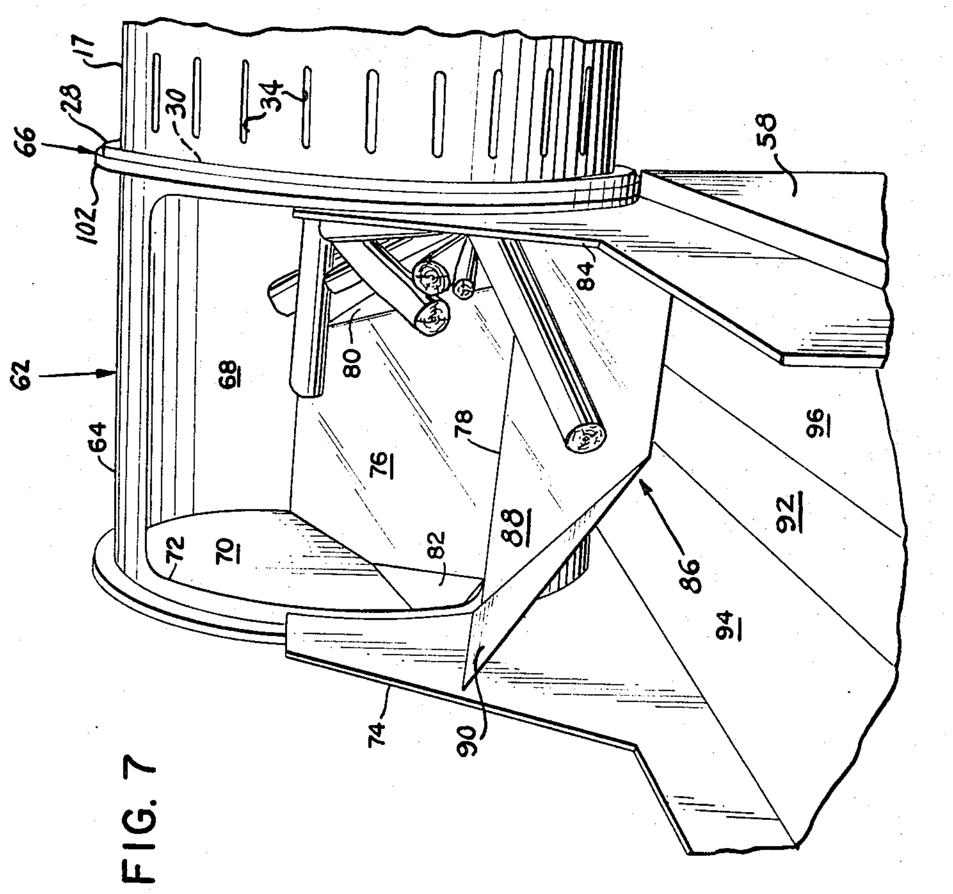
FIGURE 7 is a schematic perspective view of the log discharge control structure.
Figure 8:
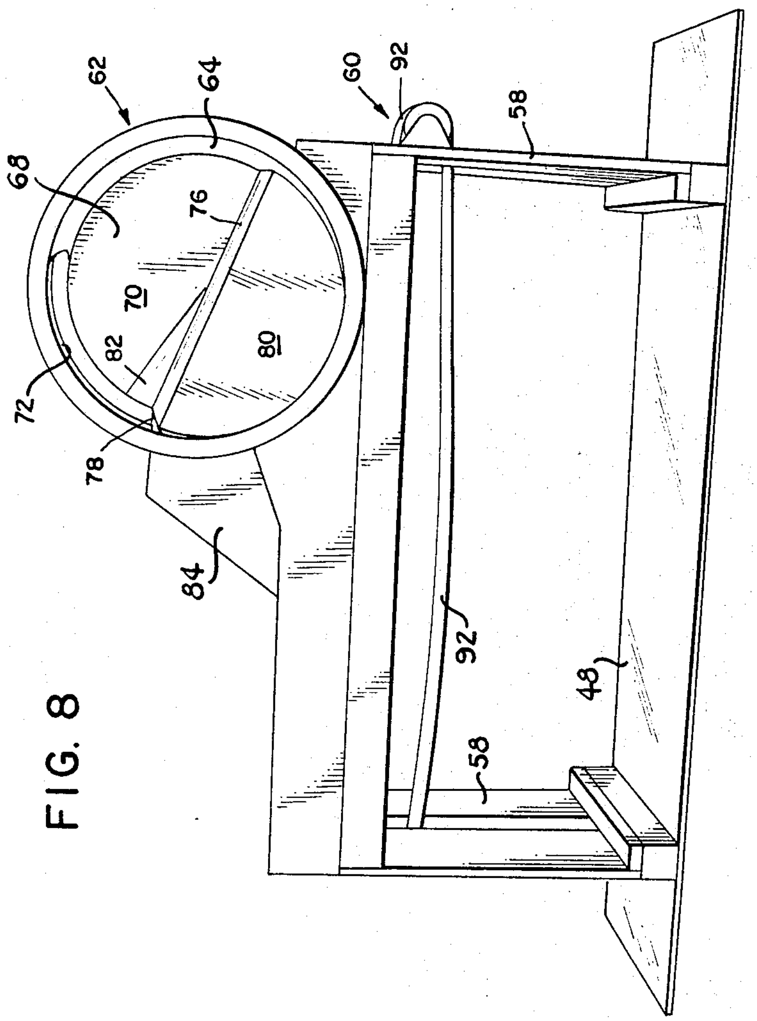
FIGURE 8 is a schematic end elevational view of the log discharge control structure, illustrating such structure in the position normal operative or intermediate as in FIGURE 4.

As best illustrated in FIGURES 7, 8 and 9, the upstream or inboard end portion of the deck plate 76 is likewise slanted slightly out of a plane disposed substantially perpendicular to the longitudinal axis of the cylindrical housing member 64 so that the edge portion of the deck plate 76 adjacent the edge portion 78 of the rectangular opening 72 in the housing member 64 extends substantially entirely therealong while the opposite or opposed edge portion of the deck plate 76 extends substantially less than completely longitudinally along the cylindrical housing member 64.

A second member or baffle plate 80 is structurally associated between the deck plate 76 and the cylindrical housing member 64 so that logs being discharged through the discharge opening 30 from the chamber C of the drum D cannot enter below the deck plate 76 but are guided by the second member or baffle plate 80, and only those logs above the surface of the deck plate 76 are permitted to enter thereupon and be received within the discharge chamber 68 of the housing member 64.

The baffle plate 80 is likewise tilted in a downstream direction slightly away from a generally perpendicular plane to the longitudinal axis of the cylindrical housing member 64. Additionally, keeping in mind the construction and configuration of the deck plate 76 hereinbefore set forth, the portion of the baffle plate 80 farthest removed from the juncture thereof with the deck plate 76 is closer to the discharge opening 30 of the chamber C of the drum D than to the juncture of the baffle plate 80 with the deck plate 76. Accordingly, logs being pushed against the baffle plate 80 during operation of the debarking drum D will tend to move generally upwardly and outwardly therealong onto the surface of the deck plate 76.

At the downstream end portion of the deck plate 76 there is provided a third plate-like member 82 which is disposed in an inclined relationship relative to a perpendicular to the longitudinal axis of the housing member 64 so that the material such as logs which have been biased on to the deck plate 76 toward the end plate 70 will be further biased through the discharge opening 72 toward the conveyor arrangement 60.

The conveyor arrangement 60, of the discharge ramp or chute support frame structure 56 comprises a side plate 84 laterally spaced from the side plate 74 and extends generally outwardly from the cylindrical housing member 64 at a location which is between the opening 72 therein and the rotatable support member 66.

A discharge chute 86 is structurally associated with and extends between the two side plates 74 and 84 of the conveyor arrangement 60 and may, if desired, be adjustably mounted thereon for generally up and down movement relative to the edge portion 78 of the discharge opening 72 in the housing member 64. The chute 86 comprises a generally horizontally extending portion 88 sloped slightly downwardly away from the end plate 70 to cause logs sliding thereon to move generally transversely outwardly of the discharge opening 72 and towards the side plate 84 of the conveyor arrangement 60. The discharge chute 86 is further provided with an angular portion 90 inclined generally upwardly toward the end plate 70 of the housing member 64 and adjacent thereto so that logs directed onto the discharge chute 86 will be directed by the inclined portion 88 and the angular portion 90 toward the side plate 84. The entire discharge chute 86, comprising the inclined portion 88 and the angular portion 90, slopes generally downwardly and outwardly transversely of the discharge hood 62 to cause logs thereon to move transversely outwardly of the discharge hood 62.

The conveyor arrangement 60 further comprises, as illustrated, an endless belt-type conveyor 92 extending generally longitudinally and centrally of the side plates 74 and 84, from a location beneath the discharge hood 62 generally outwardly therefrom. A pair of inclined aprons 94 and 96 are structurally associated with the side plates 74 and 84 to define a trough therebetween with the belt-type conveyor 92 extending along the bottom portion thereof. The belt-type conveyor 92, could be replaced by a chute member or some other type of suitable conveying means but it has been found preferable to utilize an endless belt-type conveyor along the bottom of the trough as defined by the aprons 94, 96 and the side plates 74 and 84. The discharge chute 86 and the trough defined by the side plates 74 and 84, the aprons 94 and 96, and the belt-type conveyor 92, are thereby effective to longitudinally orient any logs impinging upon the discharge chute 86 and transfer the logs therealong to a location that is generally remote or outwardly from the discharge hood 62.

With particular reference not to FIGURES 2, 3 and 10–14 inclusive, there is shown and illustrated therein a preferred arrangement for mounting and rotating the discharge hood 62 of the housing member 64. Lengths of standard roller chain 98 are fastened to self-adjusting cradle supports 100 and the end plate 70 together with the ridge or flange 102 on the open end of the discharge hood 62 are supported on rollers 104 of the roller chain 98. Since standard roller chain comprises a series of rollers interconnected by side bars 106, there is provided a simple, high capacity support in a minimum space.

The self-aligning cradle supports 100 (see FIGURES 10 and 13) comprise an arcuate top rail 108 having a plurality of longitudinally extending laterally spaced apart generally radially outwardly projecting guiding members 110 positioned on each side thereof to support the side bars or plates 106 of the roller chain 98 so that the rollers 104 thereof are free to rotate within a channel defined by the top rail 108 and the guiding members 110. The end plate 70 or the flange 102 of the discharge hood 62 may then be rotatably supported directly on the rollers 104 of the roller chain 98.

The arcuate top rail 108 of the self-aligning cradle support 100 is supported on a body portion 112 which in turn is pivotally supported on a roller structure 114, structurally operably associated with a ledge 115 on the side plates 74 and 84 of the conveyor arrangement 60 thus enabling the self-aligning cradle support 100 to freely pivot to maintain supporting contact between the roller chain 98 and the end plates 70 or 102.

A side guide 116 is provided to guide the bottom portion of the end plates 70 and 102 to prevent longitudinal movement thereof. The guides 116 (see FIGURES 10 and 11) comprise a plurality of side members 118 and 120 joined together by means such as bolts 122 into the plates 118 and 120 being structurally associated as by welding 124 with the ledge 118 with side plates 74 and 84.

In operation, with the discharge hood 62 having the housing member 64 thereof disposed in the normal operative or intermediate position as illustrated in FIGURE 5 with the edge portion 78 that is defined by the inner section of the first member of deck plate 76 and the discharge opening 72 being in alignment with the center portion 88 of the chute 86 the drum or shell structure D may be rotated or actuated by the source of power 52 so that the second member or baffle plate 80 of the housing member 64 of the discharge hood 62 is effective to close off a part of the discharge opening 30 in the drum D while enabling the remaining part thereof to be open so that logs which are discharged through the opening 30 of the drum D are urged by the inclined disposition of the second member or baffle plate 82 on to the first member or deck plate 76 and by reason of the inclination of the first member or deck plate 76 the logs will be restrained in movement through the discharge opening 72 on to the conveyor arrangement 60.

The level of the logs which are being processed within the chamber C of the drum or shell structure D may be varied by rotating the housing member 64 through the drive arrangement 128, the electric motor 126 and the roller chain 98 in the direction of the double headed arrows in FIGURES 4, 5 and 6 so that the housing member 64 is rotated about a longitudinal axis which is common to the longitudinal axis about which the drum or shell structure D may be rotated.

With the deck plate 76 of the housing member 64 aligned with the discharge chute 86, the level of wood at the discharge area of the chamber C of the drum D will build up in the discharge opening 30 to the height of the deck plate 76. The wood level in the inlet area of the chamber C, that is adjacent the inlet opening 22 thereof, will be slightly higher than the wood level at the discharge area, thus defining a head which causes the logs to flow through the chamber C of the drum D as the drum D is rotated by the power source 52. As the level in the discharge opening 30 of the chamber C of the drum D rises above the level of the deck plate 76 of the discharge hood 62, the logs will flow outwardly on to the deck plate 76 and slide to the discharge chute 86. The incline of the deck plate 76 and the third member or plate 82 assist in the movement of the logs outwardly and off the deck plate 76 on to the discharge chute 86. The angular portion 90 of the chute 86 will deflect logs generally backward or toward the side plate 84 so that the deflected logs will fall on the apron 96 and then roll downward on to the conveyor 92 in a manner which will relieve or absorb the normally heavy shock of falling logs so that the conveyor 92 is not subject to damage. The slope or inclination of the baffle plate 80 enables logs to be elevated gradually onto the deck plate 76 without bounding down onto deck plate 76 and the third member 82 prevents logs from becoming jambed inside the chamber 68 of the cylindrical housing member 64.

When it is desired to temporarily stop the flow of logs from the chamber C of the drum D, the discharge hood 62 and the cylindrical housing 64 thereof are rotated to a closed, secured or extreme position as illustrated in FIGURE 4 wherein the edge 78 of the opening 72 of the cylindrical housing member 64 is above the log level within the discharge opening 30 of the chamber C thereby preventing logs from being discharged.

When it is necessary or desirable to empty the chamber C of drum D, as at the end of a run of logs, or when changing the variety or species of logs, the discharge hood 62 and especially the cylindrical housing member 64 thereof is rotated to an open, discharge or first extreme position as shown in FIGURE 6 wherein the rectangular opening 72 is positioned at the bottom with the edge portion 78 passing through a vertical which is common to the longitudinal axis of the discharge hood 62 so that substantially all of the logs to be discharged through the opening 72 will pass directly onto the aprons 94, 96 and the belt conveyor 92.

While the invention has been shown, illustrated, described and disclosed in terms of embodiments or modifications which it has assumed in practice, the scope of the invention should not be deemed to be limited by the precise embodiments or modifications herein shown, illustrated, described or disclosed, such other embodiments or modifications intended to be reserved especially as they fall within the scope of the claims here appended.

We claim as our invention:

1. Apparatus for processing material such as debarking logs comprising elongate shell structure defined by a plurality of courses secured together to define a chamber, certain ones of said shell courses being imperforate and having mounted thereon means for enabling the shell structure to be rotated about a generally longitudinally extending axis, said certain shell courses being longitudinally spaced apart with the shell courses that are disposed therebetween being perforated,
the remaining shell courses of the shell structure which are disposed generally longitudinally outwardly from the said certain shell courses defining intake and discharge areas, respectively, for receiving and discharging material from the chamber of the shell structure,
at least one of the said remaining shell courses of the shell structure being imperforate,
structure for enabling material to be passed to the intake area of the shell structure, and
structure for enabling material to be discharged from the discharge area of the shell structure, the structure for enabling material to be discharged from the discharge area of the shell structure comprising
a housing defining a chamber having an intake opening and a discharge opening therein with the intake opening thereof being in communication with the discharge area of the shell structure; and
mechanism for moving the housing relative to the shell structure.

2. The apparatus for processing material as set forth in claim 1 wherein
the mechanism rotates the housing about an axis substantially common to the longitudinal axis of rotation of the shell structure.

3. Apparatus for processing material such as debarking logs comprising
elongate shell structure defined by a plurality of courses secured together to define a chamber,
certain ones of said shell courses being imperforate and having mounted thereon means for enabling the shell structure to be rotated about a generally longitudinally extending axis,
said certain shell courses being longitudinally spaced apart with the shell courses that are disposed therebetween being perforated,
the remaining shell courses of the shell structure which are disposed generally longitudinally outwardly from the said certain shell courses defining intake and discharge areas, respectively, for receiving and discharging material from the chamber of the shell structure,
at least one of the said remaining shell courses of the shell structure being imperforate,
structure for enabling material to be passed to the intake area of the shell structure, and
structure for enabling material to be discharged from the discharge area of the shell structure, the structure for enabling materials to be discharged from the discharge area of the shell structure comprising
a housing defining a chamber having an intake opening and a discharge opening therein with the intake opening thereof being in communication with the discharge area of the shell structure;
a first member disposed within the chamber of the housing and extending therethrough from the intake opening to the discharge opening thereof; and
a second member disposed adjacent the intake opening of the housing for urging material which may pass from the discharge area of the shell structure to the first member with the second member defining a closure for effectively closing a part of the discharge area of the shell structure while enabling the remaining part thereof to be open to control the discharge of material therefrom.

4. The apparatus for processing material as set forth in claim 3 wherein
the first member is disposed in a plane that diverges from longitudinal axis of the housing in a direction away from the intake opening therein.

5. The apparatus for processing material as set forth in claim 3 wherein
said second member is disposed in a plane that diverges from a perpendicular to the longitudinal axis of the housing in a direction away from the intake opening therein.

6. The apparatus for processing material as set forth in claim 3 wherein
the first member is disposed in a plane that diverges from the rotational axis of the housing in a direction away from the intake opening therein, and
the second member is disposed in a plane that diverges from a perpendicular to the rotational axis of the housing in a direction away from the intake opening therein.

7. The apparatus for processing material as set forth in claim 3 together with
a third member inclined relative to the first member at a location which is intermediate the first member and the discharge opening of the housing.

8. The apparatus for processing material as set forth in claim 3 together with
an arrangement for moving the housing in order to vary the part of the discharge area which is closed by the second member to enable the level of material which is being processed in the chamber of the shell structure to be raised or lowered in response to movement of the housing.

9. The apparatus for processing material as set forth in claim 3 wherein
the first member defines an edge with the discharge opening of the housing.

10. The apparatus for processing material as set forth in claim 9 together with
an arrangement for moving the housing in order to raise or lower the edge defined by the first member and the discharge opening of the housing in order to control the discharge of material from the shell structure.

11. An arrangement for controlling the discharge of material from a structure having a discharge area, said arrangement comprising,
a housing defining a chamber having an intake opening and a discharge opening therein with the intake opening thereof being in communication with the discharge area of the structure,
a first member disposed within the chamber of the housing and extending therethrough from the intake opening to the discharge opening thereof, and
a second member disposed adjacent the intake opening of the housing for urging material which may pass from the discharge area of the structure to the first member with the second member defining a closure for effectively closing a part of the discharge area of the structure while enabling the remaining part thereof to be open.

12. The arrangement as set forth in claim 11 wherein
the first member is disposed in a plane that diverges from a longitudinal axis of the housing in a direction away from the intake opening therein.

13. The arrangement as set forth in claim 11 wherein
said second member is disposed in a plane that diverges from a perpendicular to a longitudinal axis of the housing in a direction away from the intake opening therein.

14. The arrangement as set forth in claim 11 wherein
the first member is disposed in a plane that diverges from a longitudinal axis of the housing in a direction away from the intake opening therein, and
the second member is disposed in a plane that diverges from a perpendicular to a longitudinal axis of the housing in a direction away from the intake opening therein.

15. The arrangement as set forth in claim 11 wherein the chamber defined by the housing is larger adjacent the intake opening therein than adjacent the discharge opening thereto.

16. The apparatus for processing material as set forth in claim 11 together with
a third member inclined relative to the first member at a location which is intermediate the first member and the discharge opening of the housing.

17. The arrangement as set forth in claim 11 together with
mechanism for moving the housing in order to vary the part of the discharge area which is closed by the second member to enable the level of material which is being processed in the structure to be raised or lowered in response to movement of the housing.

18. The arrangement as set forth in claim 11 wherein said housing is of substantially cylindrical configuration with the intake opening being disposed in one end portion and the discharge opening being in the side portion thereof.

19. The arrangement as set forth in claim 11 wherein the first member defines an edge with the discharge opening of the housing.

20. The arrangement as set forth in claim 19 together with
mechanism for moving the housing in order to raise and lower the edge defined by the first member and the discharge opening of the housing in order to control the discharge of material from the structure.

References Cited

UNITED STATES PATENTS

| | | | |
|---|---|---|---|
| 1,148,136 | 7/1915 | Alfsen | 144—208 |
| 1,463,887 | 8/1923 | Guettler | 144—208 |
| 2,684,092 | 7/1954 | Dick | 144—208 |
| 2,592,054 | 4/1952 | Mertz et al. | 144—208 |
| 2,943,656 | 7/1960 | Wakeman | 144—208 |
| 3,020,943 | 2/1962 | Hjartsater | 144—208 |

FRANCIS S. HUSAR, *Primary Examiner.*

W. D. BRAY, *Assistant Examiner.*

U.S. Cl. X.R.

144—311